(12) United States Patent
Bushell et al.

(10) Patent No.: US 8,832,748 B2
(45) Date of Patent: Sep. 9, 2014

(54) APPARATUS FOR AIRCRAFT DUAL CHANNEL DISPLAY

(75) Inventors: Mark Anthony Bushell, Cheltenham (GB); Brett Allen Eddy, Phoenix, AZ (US)

(73) Assignee: GE Aviation Systems Limited, Cheltenham (GB)

( * ) Notice: Subject to any disclaimer, the term of this patent is extended or adjusted under 35 U.S.C. 154(b) by 124 days.

(21) Appl. No.: 13/608,230

(22) Filed: Sep. 10, 2012

(65) Prior Publication Data
US 2013/0276037 A1    Oct. 17, 2013

(30) Foreign Application Priority Data
Apr. 16, 2012  (GB) .................................. 12066544

(51) Int. Cl.
*H04N 7/18* (2006.01)
(52) U.S. Cl.
USPC .......................................................... 725/76
(58) Field of Classification Search
USPC .......................................................... 725/76
See application file for complete search history.

(56) References Cited

U.S. PATENT DOCUMENTS

| | | | |
|---|---|---|---|
| 4,859,997 A | 8/1989 | Bouron et al. | |
| 5,631,754 A * | 5/1997 | Jannson et al. | 349/64 |
| 5,668,569 A | 9/1997 | Greene et al. | |
| 6,285,360 B1 | 9/2001 | Li | |
| 6,977,666 B1 | 12/2005 | Hedrick | |
| 7,724,259 B2 | 5/2010 | Hedrick et al. | |
| 8,098,175 B2 | 1/2012 | Berthou et al. | |
| 2002/0075248 A1 | 6/2002 | Morita et al. | |
| 2005/0284984 A1 | 12/2005 | De Lauzun et al. | |
| 2007/0046680 A1 | 3/2007 | Hedrick et al. | |
| 2008/0208399 A1 | 8/2008 | Pham | |
| 2008/0284694 A1 | 11/2008 | Dunn | |
| 2010/0090868 A1 | 4/2010 | Hall | |
| 2012/0062612 A1 | 3/2012 | Tanada et al. | |
| 2012/0256768 A1 | 10/2012 | Kratchounova et al. | |
| 2012/0280986 A1 | 11/2012 | Chabot et al. | |
| 2013/0120664 A1 * | 5/2013 | Bushell et al. | 348/731 |
| 2013/0250186 A1 * | 9/2013 | Bushell et al. | 348/790 |
| 2013/0276037 A1 * | 10/2013 | Bushell et al. | 725/76 |

FOREIGN PATENT DOCUMENTS

| | | |
|---|---|---|
| EP | 1783699 A2 | 5/2007 |
| FR | 2843646 A1 | 2/2004 |
| FR | 2974938 A1 | 11/2012 |
| GB | 2447967 A | 10/2008 |
| JP | 2007212956 A | 8/2007 |
| WO | 9853366 A1 | 11/1998 |
| WO | 2008009955 A1 | 1/2008 |

OTHER PUBLICATIONS

Search Report from corresponding GB Application No. 1206654.4, Aug. 14, 2012.

(Continued)

*Primary Examiner* — Kieu Oanh T Bui
(74) *Attorney, Agent, or Firm* — McGarry Bair PC (57) ABSTRACT

An aircraft cockpit display includes among other things a display panel having a pixel matrix, a backlight for illuminating the matrix, a first video channel having a row driver and a column driver for driving a first portion of the pixels, and a second video channel having a row driver and a column driver for driving a second portion of the pixels.

20 Claims, 6 Drawing Sheets

(56) References Cited

OTHER PUBLICATIONS

Search Report and Written Opinion from GB Application No. 1219666.3 dated Feb. 20, 2013.
Search Report and Written Opinion from FR Application No. 1260007 dated Aug. 23, 2013.
Search Report for corresponding GB Application No. 1119482.6, dated Feb. 13, 2012.
Search Report from corresponding GB Application No. 1204840.1, Jun. 28, 2012.
David Allen: "Electronic Flight Bag (EFB)" Internet Citation Oct. 10, 2006, pp. 1-17, XP002496643 Internet Extract URL: http://web.archive.org/web/20061010202846/http://www.boeing.com/commercial/aeromagazine/aero_23/EFB_story.html (extracted on Sep. 22, 2008) the whole document.
Search Report for corresponding FR1352189, dated Feb. 6, 2014.

* cited by examiner

APPARATUS FOR AIRCRAFT DUAL CHANNEL DISPLAY

CROSS-REFERENCE TO RELATED APPLICATIONS

This application claims priority under 35 U.S.C. §119 to British Patent Application No. 12066544, filed Apr. 16, 2012, the disclosure of which is incorporated herein by reference.

BACKGROUND OF THE INVENTION

Contemporary aircraft cockpits include a flight deck having multiple flight displays, which display to the flight crew a wide range of aircraft, flight, navigation, and other information used in the operation and control of the aircraft. Within the aviation industry there is a trend towards using large widescreen format displays within the cockpit. This brings the advantage of providing a larger configurable display surface to provide more information to the flight crew and offers the ability to tailor display formats and information displayed. Because all primary flight information may be displayed on the single display surface instead of a plurality of displays or instruments the loss of the single display surface will be far more severe than with the traditional approach.

BRIEF DESCRIPTION OF THE INVENTION

In one embodiment, an aircraft cockpit display includes a display panel having a matrix of pixels arranged in rows and columns, a backlight for illuminating the matrix, a first video channel having a row driver and a column driver for driving a first portion of the pixels and a second video channel having a row driver and a column driver for driving a second portion of the pixels wherein the first portion of the pixels is interleaved with the second portion of the pixels and the first and second video channels are independent.

DESCRIPTION OF EMBODIMENTS OF THE INVENTION

Figure 1:
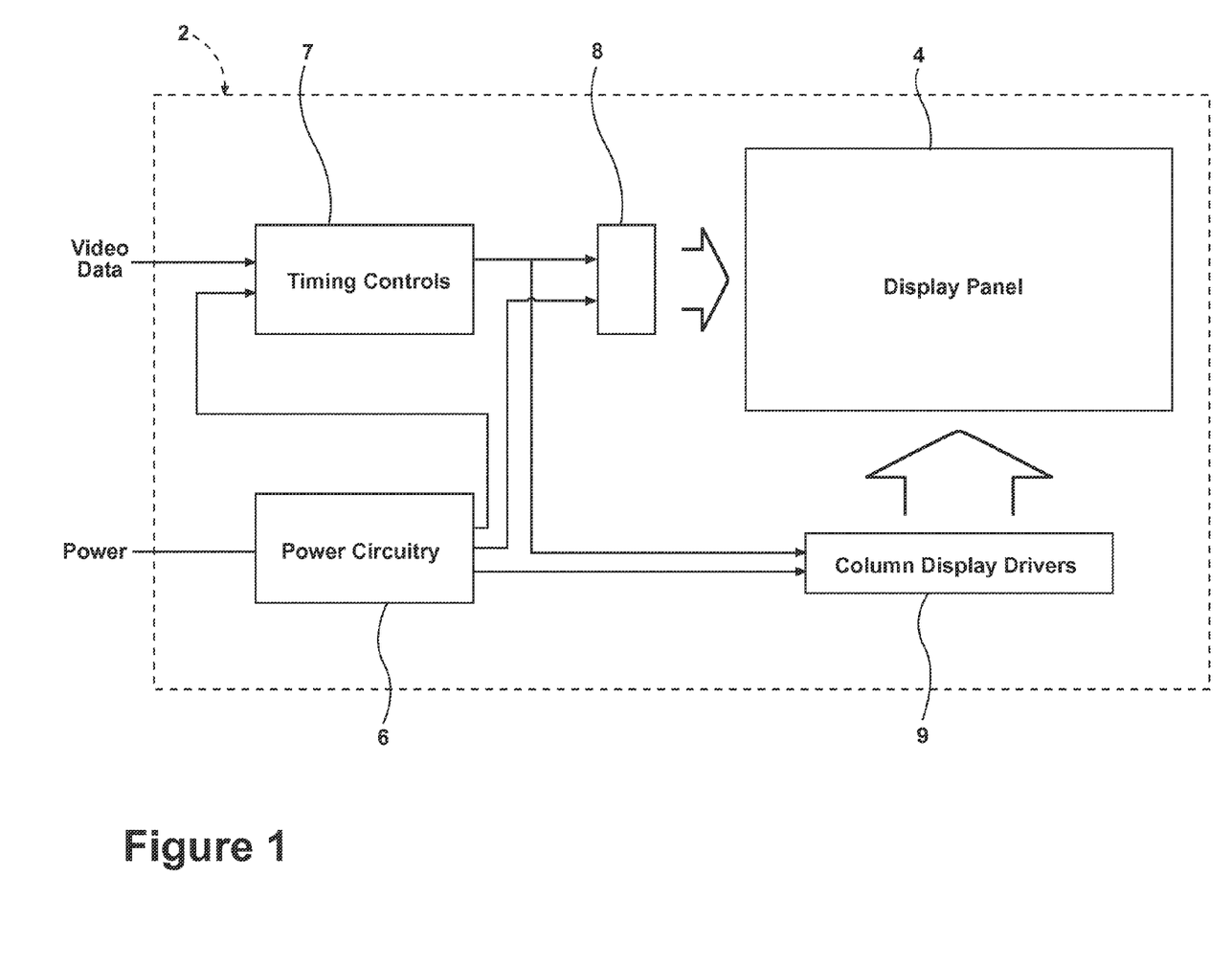
FIG. 1 is a schematic view of a prior design flight display module.

FIG. 1 illustrates a prior design flight display module 2. The flight display module 2 includes a display panel 4, which may be a widescreen LCD display panel, and associated power and control electronics including power circuitry 6, timing controls 7, and display drivers in the form of row and column display drivers 8 and 9. Power and video data are fed into the flight display module 2 and any failure within the prior design flight display module 2, whether with the power circuitry 6, timing controls 7, or display drivers 8 and 9, would adversely affect the ability of the flight display module 2 to display uncorrupted video data on the display panel 4. The corruption could manifest itself as either partial or full screen video corruption on the LCD panel. When the display is a widescreen display, the effect of the loss of such a large area display is significantly more acute than the loss of a single mechanical instrument or loss of smaller electronic flight instrument displays on conventionally equipped aircrafts.

Figure 2:
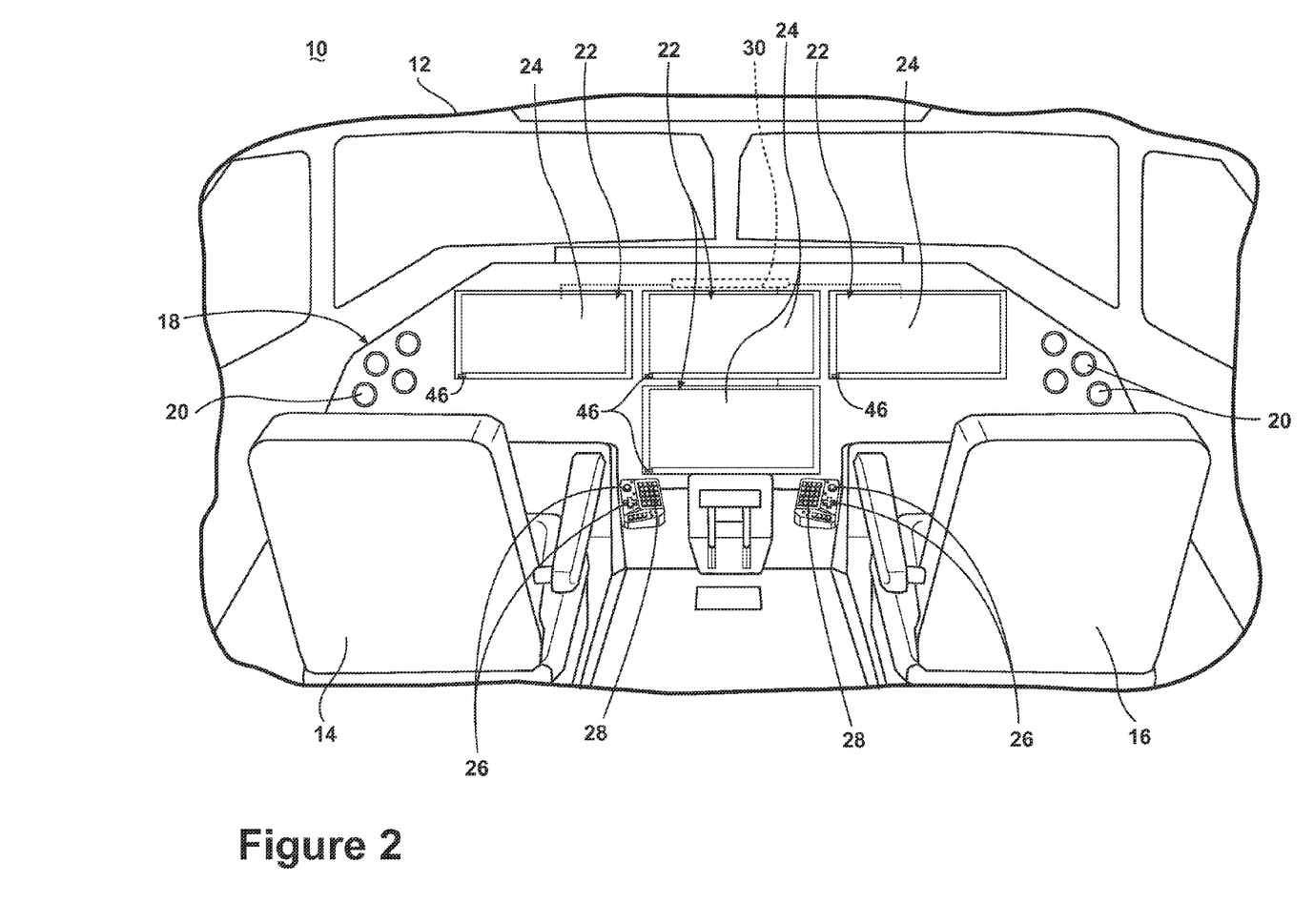
FIG. 2 is a perspective view of a portion of an aircraft cockpit having multiple flight display modules according to an embodiment of the invention.

The below described inventive embodiments ensure that the flight display module has high availability and that any single failure, excluding that of the LCD panel itself, has no impact on the primary display functions. FIG. 2 illustrates a portion of an aircraft 10 having a cockpit 12 according to one embodiment of the invention. While a commercial aircraft has been illustrated, it is contemplated that the embodiments of the invention may be used in any type of aircraft, for example, without limitation, fixed-wing, rotating-wing, rocket, personal aircraft, and military aircraft. A first user (e.g., a pilot) may be present in a seat 14 at the left side of the cockpit 12 and another user (e.g., a co-pilot) may be present at the right side of the cockpit 12 in a seat 16. A flight deck 18 having various instruments 20 and multiple flight display modules 22 may be located in front of the pilot and co-pilot and may provide the flight crew with information to aid in flying the aircraft 10. The flight display modules 22 may include either primary flight displays or multi-function displays and may display a wide range of aircraft, flight, navigation, systems, and other information used in the operation and control of the aircraft 10. The flight display modules 22 have been illustrated as being in a spaced, side-by-side arrangement with each other. The flight display modules 22 may be laid out in any manner including having fewer or more displays. Further, the flight display modules 22 need not be coplanar and need not be the same size. A display panel 24 on which the display representation may be provided may be included in the flight display modules 22. This display panel may include any display panel having a matrix of individually controllable pixels, such as LCD and LED. By way of non-limiting example the display panel 24 may be a flat Active Matrix Liquid Crystal Display (AMLCD) panel.

It is contemplated that one or more cursor control devices 26 and one or more multifunction keyboards 28 may be included in the cockpit 12 and may also be used by one or more flight crew members to interact with the systems of the aircraft 10. A suitable cursor control device 26 may include any device suitable to accept input from a user and to convert that input to a graphical position on any of the multiple flight display modules 22. Various joysticks, multi-way rocker switches, mice, trackballs, and the like are suitable for this purpose and each user may have separate cursor control device(s) 26 and keyboard(s) 28.

A controller 30 may be operably coupled to components of the aircraft 10 including the flight display modules 22, cursor control devices 26, and keyboards 28. The controller 30 may also be connected with other controllers (not shown) of the aircraft 10. The controller 30 may include memory and processing units, which may be running any suitable programs to operate the aircraft 10. The controller 30 may also receive inputs from one or more other additional sensors (not shown), which may provide the controller 30 with various information to aid in the operation of the aircraft 10.

Figure 3:
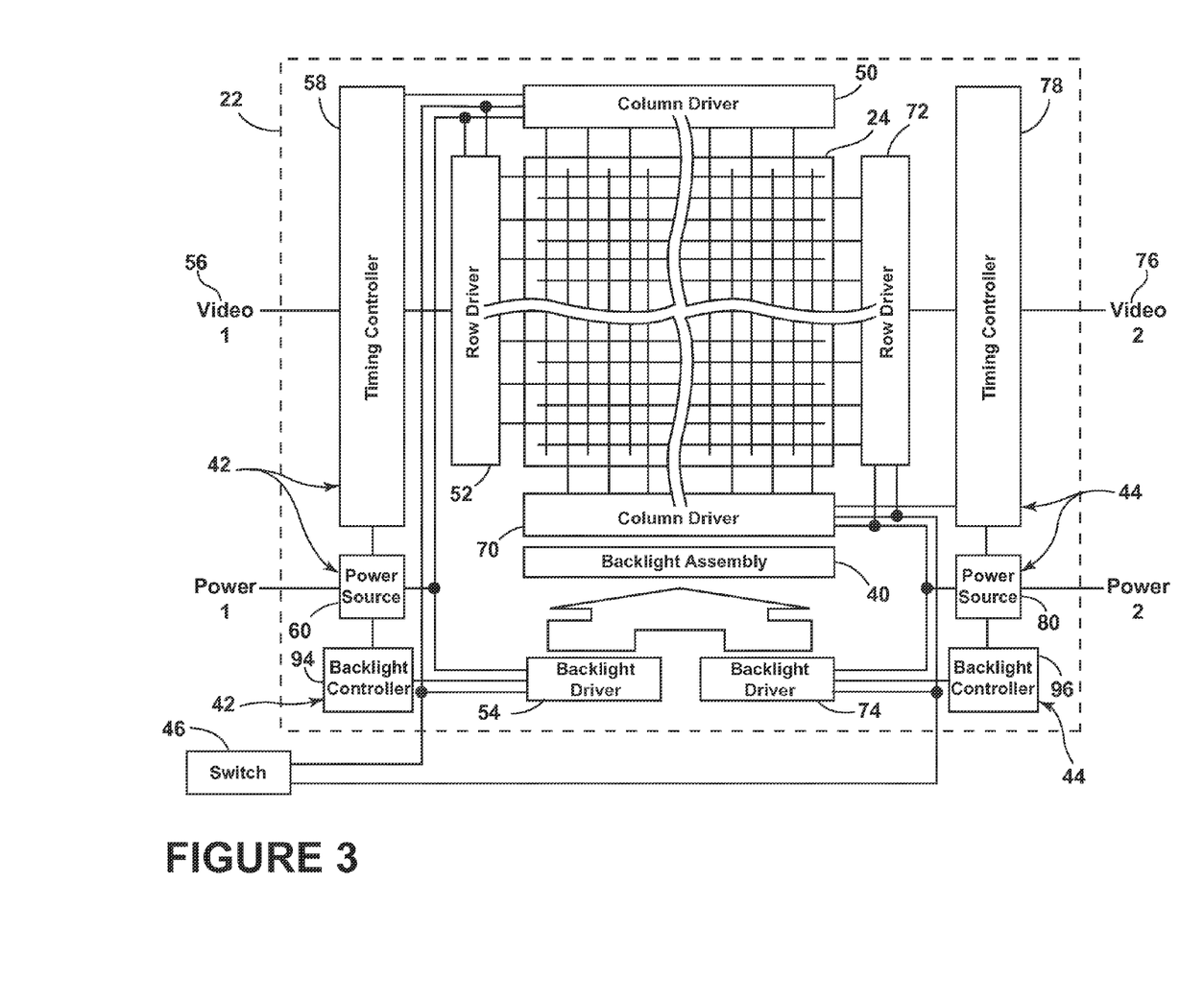
FIG. 3 is a schematic view of one of the flight display modules of the aircraft cockpit of FIG. 2.

FIG. 3 illustrates a schematic embodiment of the flight display module 22. The display panel 24, a backlight assembly 40 such as a light emitting diode (LED) backlight assembly, a first channel 42 consisting of a power source 60, timing controller 58, backlight controller 94, column driver 50, row driver 52, and LED backlight driver 54, and a second channel 44 consisting of a power source 80, timing controller 78, backlight controller 96, column driver 70, row driver 72, and LED backlight driver 74 are illustrated as being included in the flight display module 22. A switch 46 is illustrated as being operably coupled to the flight display module 22.

The display panel 24 may include a liquid crystal matrix (not shown) with an array of pixels 25 arranged in columns and rows, where each pixel 25 consists of multiple color groups, and where each color group consists of multiple subpixels, and each subpixel is addressable by rows and columns and programmed by their associated row and column drivers. For example, one half of the color groups of pixels 25 may be driven by one set electronics of the first channel 42 and the other half of the color groups of pixels 25 may be driven by the electronics of the independent second channel 44. Such a display panel 24 may include a horizontal dimension of 13.2 inches (335 mm), a vertical dimension of 7.9 inches (201 mm), that is, an aspect ratio of 16:9 and a diagonal dimension of 15.3 inches (389 mm). It will be appreciated that different size screens could be used and that the aspect ratio could be changed from the wide screen format mentioned above. Further, the display panel 24 may include a higher density display having an increased number of pixels 25.

The LED backlight assembly 40 may be mounted behind the display panel 24 and may include an array of LEDs (not shown). Such LED arrays reproduce color better and consume less electricity then cathode fluorescent lamps. The array of LEDs in the LED backlight assembly 40 may be mounted on a printed circuit board (not shown) to give sufficient light to illuminate the liquid crystal matrix of the display panel 24.

First channel 42 and second channel 44 are two identical and independent video channels capable of displaying a video signal on the LCD panel. The first channel 42 is illustrated as including column drivers 50, row drivers 52, LED drivers 54, a timing controller 58, backlight controller 94, and a power source 60. The second channel 44 is illustrated as including column drivers 70, row drivers 72, LED drivers 74, a timing controller 78, backlight controller 96, and a power source 80.

The column drivers 50 and 70 and row drivers 52 and 72 of the first and second channels 42 and 44, respectively, are operably coupled to the columns and rows in the liquid crystal matrix of the display panel 24 and drive electrically isolated, interleaved color groups within pixels 25 (FIGS. 4A through 4E).

The LED backlight drivers 54 and 74 are operably coupled to the array of LEDs of the LED backlight assembly 40 to control the LED backlight assembly 40 to illuminate the liquid crystal matrix of the display panel 24. Each of the LED backlight drivers 54 and 74 are capable of selectively driving the array of LEDs of the LED backlight assembly 40.

The timing controller 58 of the first channel 42 is operably coupled to the column drivers 50 and row drivers 52. The timing controller 58 is capable of outputting control signals to the column driver 50 and row driver 52. The timing controller 78 of the second channel 44 is operably coupled to the column drivers 70 and row drivers 72. The timing controller 78 is capable of outputting control signals to the column drivers 70 and row drivers 72.

The backlight controller 94 of the first channel 42 is operably coupled to the LED backlight driver 54. The backlight controller 94 is capable of outputting control signals to the LED backlight driver 54. The backlight controller 96 of the second channel 44 is operably coupled to the LED backlight driver 74. The backlight controller 96 is capable of outputting control signals to the LED backlight driver 74. It is contemplated that the timing controller and backlight controller of each of the first and second independent video channels 42 and 44 may be implemented separately or may be implemented within a single device.

A first power input or power source 60 is included in the first channel 42 and supplies power to the components of the first channel 42. A second power input or power source 80 is included in the second channel 44 and supplies power to the components of the second channel 44.

The switch 46 provides for selecting between the first and second independent video channels 42 and 44 to display a video signal from the selected first and second independent video channels 42 and 44 on the display panel 24. The switch 46 may be a manual switch that is located within reach of a pilot and/or co-pilot within the cockpit 12. The switch 46 may be integrated with the flight display module 22. For example, the switch has been illustrated as being externally mounted to the flight display module 22.

It is contemplated that the switch 46 may be a multiple position manual switch that selects either the first channel 42 or the second channel 44 to be the active channel or selects both channels 42 and 44 to be active. It is contemplated that the manual switch 46 could also include an auto switch position. When the auto switch position is selected, an arbiter module (not shown) within the flight display module 22 may default to a predefined channel when the flight display module 22 is powered up and may monitor the health of each function within each of the first and second independent video channels 42 and 44 that affects the integrity of the video data stream. In the event a fault is detected, the alternative channel would be automatically switched over to the active channel.

While the switch 46 has been illustrated and described as a manual switch, it is contemplated that the switch 46 may be entirely automatic. Such an automatic switch may be included within the flight display module 22. The automatic switch may be capable of switching between the first and second independent video channels 42 and 44 in response to a failure in one of the first and second independent video channels 42 and 44 and may act similarly to the auto switch position described above. Such an automatic switch mechanism or arbiter module may be duplicated within the flight display module 22.

The above described embodiment may be capable of operating with both first and second independent video channels 42 and 44 active. The above described embodiment may also be capable of operating in a full screen single channel mode of operation following a failure with the drive electronics because of the interleaved pixels 25. In FIGS. 4A through 4E the pixels are schematically illustrated as being arranged in columns and rows and each pixel 25 includes multiple color groups and each color group contains multiple subpixels of varying colors. More specifically, a subpixel includes a single color element such as a green stripe. For purposes of this specification, a color group includes a group of three subpixels with one red subpixel, one green subpixel, and one blue subpixel. It is contemplated that the pixels 25 may be interleaved, either at the color group level (RGB) or at the subpixel level (R, G, or B), such that the entire display panel 24 may be usable for graphics following loss of the electronics in one of the channels.

Figure 4A:
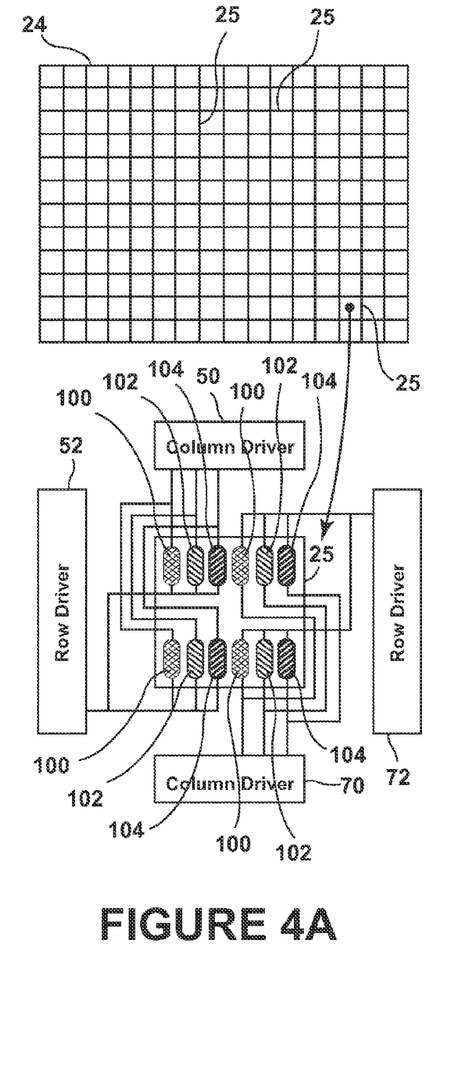
FIG. 4A through FIG. 4E provide schematic views of pixel and subpixel arrangements that may be used in the flight display of FIG. 3.
Figure 4B:
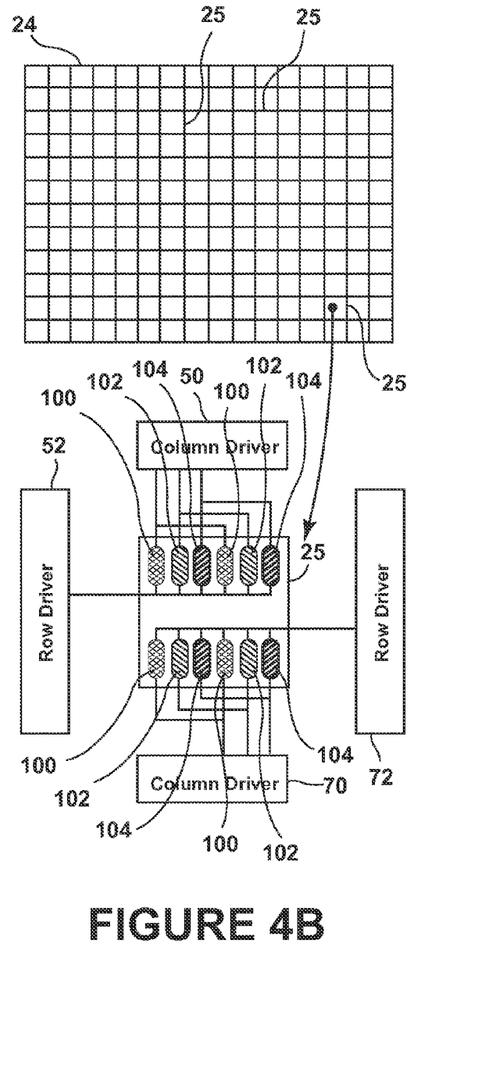
Figure 4C:
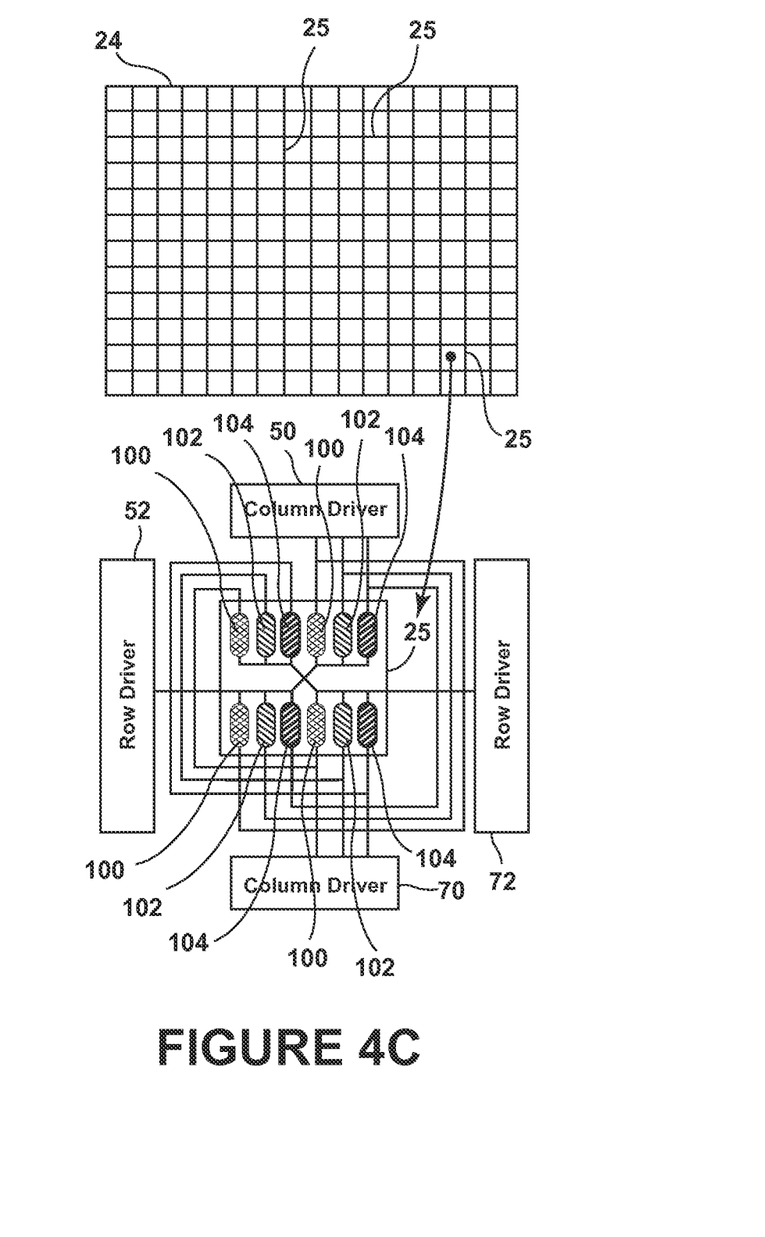
Figure 4D:
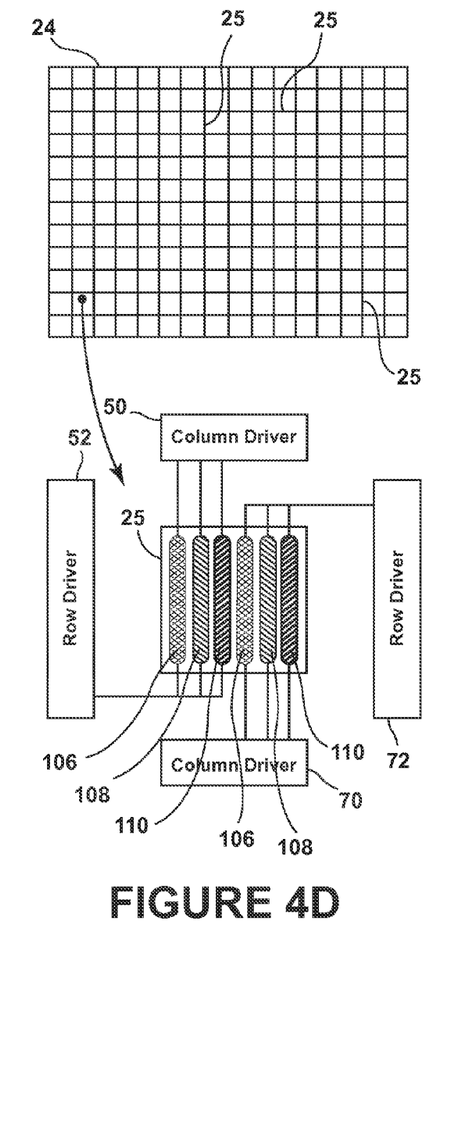
Figure 4E:
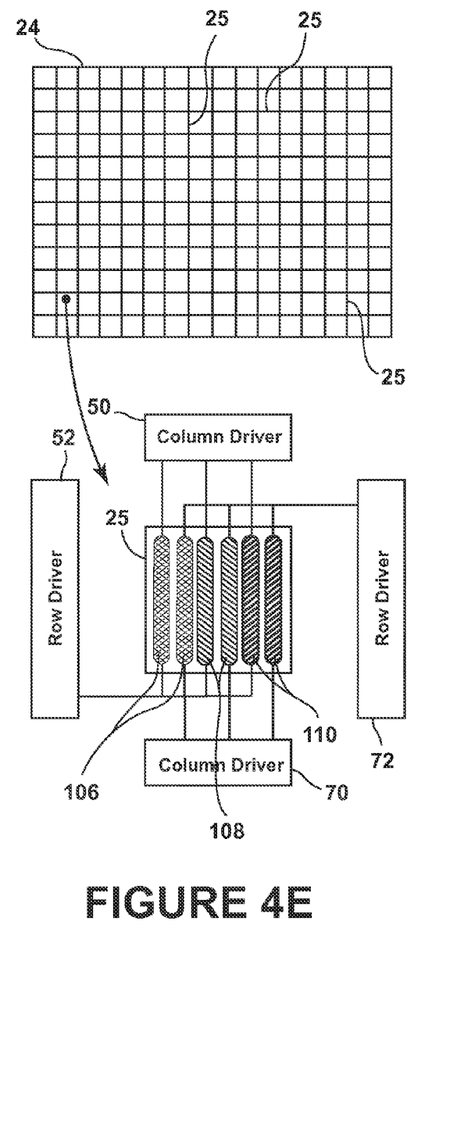

By way of non-limiting examples, the subpixels within each pixel 25 are illustrated as being arranged in various manners in the schematic illustrations shown in FIG. 4A, FIG. 4B, FIG. 4C, FIG. 4D, and FIG. 4E. In FIGS. 4A through 4C the pixels 25 include four color groups. In FIGS. 4D through 4E the pixels 25 include two color groups. It will be understood that these are for exemplary purposes only and that any suitable number of color groups may be included in each pixel and any number of subpixels may be included in each color group.

In FIGS. 4A through 4C it may be seen that the each pixel 25 includes four color groups and each color group includes three subpixel stripes, which are typically red subpixel stripes 100, green subpixel stripes 102, and blue subpixel stripes 104, and may be arranged in sections with color groups in each section driven by the same channel. While the examples describe the subpixels as including supbixel stripes the subpixels may have alternative shapes including that of a dot. In FIG. 4A the color groups are grouped by column, in FIG. 4B the color groups are grouped by row, and in FIG. 4C the color groups are cross-hatched. In the Figures above, the various color groups may be driven by the first and second channels 42 and 44 to provide the benefit of an even distribution of active subpixels across the display panel 24 upon failure of one of the channels. In this manner a first portion of the pixels may be driven by the first channel 42 and a second portion of the pixels may be driven by the second channel 44. For Example, in FIG. 4A the color group consisting of red subpixel stripes 100, green subpixel stripes 102, and blue subpixel stripes 104 in an upper left portion and a lower left portion may be driven by the first channel 42 and the color group consisting of red subpixel stripes 100, green subpixel stripes 102, and blue subpixel stripes 104 in an upper right portion and a lower right portion may be driven by the second channel 44. In FIG. 4B the color group consisting of red subpixel stripes 100, green subpixel stripes 102, and blue subpixel stripes 104 in the upper left and right portions may be driven by the first channel 42 and the color group consisting of red subpixel stripes 100, green subpixel stripes 102, and blue subpixel stripes 104 in the lower left and right portion may be driven by the second channel 44. In FIG. 4C the color group consisting of red subpixel stripes 100, green subpixel stripes 102, and blue subpixel stripes 104 in an upper left portion and a lower right portion may be driven by the first channel 42 and the color group consisting of red subpixel stripes 100, green subpixel stripes 102, and blue subpixel stripes 104 in an upper right portion and a lower left portion may be driven by the second channel 44.

In FIG. 4D and FIG. 4E, each pixel 25 includes two color groups and each color group consists of subpixel stripes which are longer than those illustrated in the previous figures and may typically include red subpixel stripes 106, green subpixel stripes 108, and blue subpixel stripes 110. The subpixel stripes 106-110 may be arranged by channel such as red subpixel stripe 106, green subpixel stripe 108, blue subpixel stripe 110, red subpixel stripes 106, green subpixel stripes 108, blue subpixel stripes 110 such as shown in FIG. 4D. Alternatively, the subpixel stripes 106-110 may be arranged by color such as red subpixel stripe 106, red subpixel stripe 106, green subpixel stripe 108, green subpixel stripe 108, blue subpixel stripe 110, and blue subpixel stripe 110 such as shown in FIG. 4E. The arrangement of FIG. 4E provides the benefit of minimal image displacement when switching from one channel to the other channel. In both FIG. 4D and FIG. 4E the color group consisting of the first red subpixel stripe 106, first green subpixel stripe 108, and first blue subpixel stripe 110 may be driven by the first channel 42 and the color group consisting of the second red subpixel stripe 106, second green subpixel stripe 108, and second blue subpixel stripe 110 of each color group may be driven by the second channel 44

It will be understood that the above figures are merely examples and that the color groups and subpixels and the corresponding driving channels may be arranged in a variety of ways. For example, while the subpixels in the examples have been arranged by color, RGB, and the wiring is adjusted as need be to connect the subpixels with the appropriate channel, it is also contemplated that the subpixels may be arranged differently to accomplish the same thing. It will be understood that the drivers operate the same no matter how the color groups and subpixels are arranged within the pixel 25. Each pixel 25 is driven by the two channels 42 and 44 and each channel drives its portion of the pixel 25 as if it is a single pixel. For FIGS. 4A through 4C, each channel connects to two color groups within a pixel 25 as the two color groups are connected in parallel and treated as one pixel. In FIGS. 4D and 4E each channel connects to only one color group.

In the above embodiments, the flight display may be operated in one of two ways. First, the two channels may be operated simultaneously, which may allow the display panel to provide double the backlight transmittance as compared to single channel operation. Second, the two channels can be selectively operated, with one of the channels serving as backup. Under the first scenario, the failure of one channel will lead to a perceived drop in brightness to the viewer. This may be compensated by increasing the intensity of the backlight. Under the second scenario, the perceived brightness will remain the same.

Under the first scenario, during normal operation, both the first channel 42 and the second channel 44 may be operated simultaneously to provide full display graphics to the display panel 24 at any time. A full screen image is provide by both sets of driver electronics and both the first channel 42 and second channel 44 may be active at the same time when both channels are operational. When both channels 42 and 44 operate at the same time they may drive the exact same image at almost the same time, or exactly the same time if the channels are synchronized, such that all color groups within a pixel 25 would be driven the same way at the same time. An active channel may be initially selected automatically or manually upon powering up of the flight display module 22. A failure within one of the channels may result in the remaining channel maintaining a full screen image in a single channel mode of operation. More specifically, the brightness of the display is reduced by half. To compensate for this, the backlight intensity may be increased. It will be understood that each subpixel or portion of the pixel may not be discernible to the naked eye and thus the visual quality may not be affected by such a failure. If each subpixel or portion of the pixel were discernible to the naked eye, then failure of one of the channels may result in degraded quality.

In the case where an active channel has been initially selected and the failure is in the active channel the selection of the other channel makes that channel the active channel and allows the appropriate row drivers, column drivers, and LED drivers to continue to be operated to provide a full screen video display on the display panel 24. When one channel is selected as active, the inactive channel may be disabled. By way of non-limiting example, the source of power may be interrupted to the deselected channel. Alternatively or in addition to the source of power being interrupted the drivers of the deselected or inactive channel may be set to an open or tri-state condition to prevent corruption of the active channel.

In the second scenario, during normal operation, it may be possible that only one of the first channel 42 or the second channel 44 may provide display graphics to the display panel 24 at any time. An active channel may be initially selected automatically or manually upon powering up of the flight display module 22 and the active channel may operate the appropriate row drivers, column drivers, and LED drivers to provide a video display on the display panel 24. In the case where the active channel has the failure, the selection of the other channel makes that channel the active channel and allows the appropriate row drivers, column drivers, and LED drivers to continue to be operated to provide a full screen video display on the display panel 24. In this manner, the same screen brightness is maintained regardless of the failure.

When one channel is selected as active, the inactive channel may be disabled. By way of non-limiting example, the source of power may be interrupted to the deselected channel. Alternatively or in addition to the source of power being interrupted the drivers of the deselected or inactive channel may be set to an open or tri-state condition to prevent corruption of the active channel.

In either scenario, switching between the first channel 42 and the second channel 44 may be carried out manually, such as by the pilot or co-pilot changing the setting of the switch 46. Alternatively, the switching could be carried out by an automatic switch in response to fault detection processing built into the flight display module 22. By way of non-limiting example, there may be a display monitor that performs error detection processing to determine whether any of the graphical information, i.e., textual information, graphic symbols and charts, is erroneous.

The above described embodiments allow for multiple benefits. For example, the above described embodiments ensure that the flight display module may be operated if any single failure, excluding the LCD panel itself, occurs. In a failed mode as described above the pixel arrangement may impact the legibility and brightness of the display panel. The arrangement of the pixels as described above allows for the display panel to be operated without disproportionate bands of color, without curved lines, and without jagged lines when a failure occurs. This minimizes the impact of the failure and may make the color blend more evenly across the display panel. Such enhanced system availability is vital given that a failure of such a flight display would result in the total loss of primary flying instruments on one side of the cockpit. The above described embodiments restrict the number of single point failures that may cause loss of display on the flight display module. The only remaining single channel device in the flight display module is the LCD itself, but the vast majority of failures result in loss of a single pixel or a single row or column of pixels, which has minimal impact on readability of the display, rather than the total loss of the LCD. Individual LEDs of the backlight may also fail, but will have minimal impact on backlight uniformity and readability of the display. The availability of the flight display to operate after a failure also allows for a reduction or elimination in maintenance delays due to electronic flight instrument system related problems associated with the display.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft cockpit display comprising:
    a display panel having a matrix of pixels arranged in rows and columns and forming a display area;
    a backlight for illuminating the matrix;
    a first video channel having a row driver and a column driver for driving a first portion of the pixels; and
    a second video channel having a row driver and a column driver for driving a second portion of the pixels;
    wherein the first portion of the pixels is interleaved with the second portion of the pixels and the first and second video channels are independent.

2. The aircraft cockpit display of claim 1, further comprising a switch for selecting between the first and second independent video channels to display a video signal on the display panel.

3. The aircraft cockpit display of claim 2 wherein the switch is an automatic switch.

4. The aircraft cockpit display of claim 3 wherein the automatic switch switches between the first and second independent video channels in response to a failure in one of the first and second independent video channels.

5. The aircraft cockpit display of claim 2 wherein the switch is a manual switch.

6. The aircraft cockpit display of claim 5 wherein the manual switch is located within reach of a pilot in the cockpit.

7. The aircraft cockpit display of claim 6 wherein the manual switch is integrated with the display.

8. The aircraft cockpit display of claim 2 wherein each of the first and second independent video channels further comprise independent sources of power.

9. The aircraft cockpit display of claim 8 wherein when a channel is deselected through the switch the source of power may be interrupted to that channel.

10. The aircraft cockpit display of claim 9 wherein when the channel is deselected the row and column drivers may be set to a tri-stated condition.

11. The aircraft cockpit display of claim 2 wherein when the channel is deselected the row and column drivers may be set to a tri-stated condition.

12. The aircraft cockpit display of claim 1 wherein each of the first and second independent video channels further comprises a timing controller.

13. The aircraft cockpit display of claim 12 wherein each of the first and second independent video channels further comprises a backlight controller operably coupled to the backlight driver.

14. The aircraft cockpit display of claim 13 wherein the timing controller and backlight controller of at least one of the first and second independent video channels are implemented within a single device.

15. The aircraft cockpit display of claim 1 wherein the first portion of the pixels and the second portion of the pixels alternate with each other.

16. The aircraft cockpit of claim 15 wherein the first and second video channels are configured to operate the first portion of pixels and the second portions of the pixels in parallel.

17. The aircraft cockpit display of claim 16 wherein when one channel fails the display has half a normal brightness.

18. The aircraft cockpit display of claim 1 wherein each pixel in the matrix includes an arrangement of color groups and each color group consists of subpixels having differing colors and the color groups form the first portion of pixels and the second portions of the pixels.

19. The aircraft cockpit display of claim 18 wherein the subpixels are arranged by color.

20. The aircraft cockpit display of claim 18 wherein the subpixels are arranged by the driving channel.

* * * * *

UNITED STATES PATENT AND TRADEMARK OFFICE
CERTIFICATE OF CORRECTION

PATENT NO.         : 8,832,748 B2                                  Page 1 of 1
APPLICATION NO.    : 13/608230
DATED              : September 9, 2014
INVENTOR(S)        : Bushell et al.

It is certified that error appears in the above-identified patent and that said Letters Patent is hereby corrected as shown below:

In the Claims

In Column 8, Line 50, in Claim 16, delete "cockpit" and insert -- cockpit display --, therefor.

In Column 8, Line 51, in Claim 16, delete "portions" and insert -- portion --, therefor.

In Column 8, Line 60, in Claim 18, delete "portions" and insert -- portion --, therefor.

Signed and Sealed this
Fourteenth Day of July, 2015

Michelle K. Lee
*Director of the United States Patent and Trademark Office*